United States Patent [19]

Wilkins

[11] 3,889,732

[45] June 17, 1975

[54] PLASTIC CONTAINERS

[76] Inventor: John B. Wilkins, Stenalees, St. Austell, Cornwall, England

[22] Filed: Oct. 11, 1973

[21] Appl. No.: 405,459

[30] Foreign Application Priority Data
Oct. 18, 1972  United Kingdom............... 47909/72

[52] U.S. Cl. ................................................. 150/48
[51] Int. Cl.............................................. B65d 1/00
[58] Field of Search............ 150/48; 220/94 A, 60 R

[56] References Cited
UNITED STATES PATENTS

| | | | |
|---|---|---|---|
| 2,051,940 | 8/1936 | Chichester-Miles................... | 150/48 |
| 2,935,108 | 5/1960 | Hall...................................... | 150/48 |
| 3,111,153 | 11/1963 | Sonka.................................... | 150/48 |
| 3,207,298 | 9/1965 | Wilson............................... | 150/48 X |
| 3,730,382 | 5/1973 | Heisler........................... | 220/94 A X |

Primary Examiner—Donald F. Norton
Attorney, Agent, or Firm—Cushman, Darby & Cushman

[57] ABSTRACT

A plastics molded container has at least one integral molded handle attached to the container by ligament hinges molded integrally with the container body and the handles. The body has a peripheral lip over which a flanged plastics lid snaps to seal the container, the handle hinges being located outwardly of the lip, so that the or each handle lies to one side of the container body in its inoperative position, while permitting fitting and removal of the lid.

6 Claims, 4 Drawing Figures

PLASTIC CONTAINERS

This invention relates to molded plastics containers.

Molded plastics containers are known in which plastics molded handles are pivotally attached to the container body by interengaging pin and socket type hinge connections. The handle and container body have to be molded separately and subsequently assembled.

An object of the present invention is to provide an improved plastics container with an integral handle or handles.

According to the present invention there is provided a container comprising a molded plastics body having an open end formed with an outwardly projecting lip; at least one plastics handle molded integrally with said body, and plastics ligament hinges connecting said at least one handle to opposite sides of the body outwardly of said lip, said at least one handle having a shape conforming to part of said lip, and being movable about said hinges between an inoperative position at one side of the container body and an operative, carrying, position extending across the open end of the container body.

Preferably the body has integrally formed outwardly projecting lugs on opposite sides, the ligament hinges of the or each handle being molded integrally with the lugs and the handle.

The plastics ligament hinges, although preferably molded at the same time as the container body and the or each handle, may alternatively be formed subsequently by scoring of the or each handle at its root portions adjoining the container. Naturally, the size of the or each handle and its ligament hinges will be gauged according to the size of the container and the weight of the material which the container is designed to hold.

In one practical embodiment of the invention the body is molded integrally with two handles the ligament hinges of which are arranged so that the handles are disposed symmetrically on opposite sides of the container body in their inoperative positions. The lip of the container body may be adapted to receive a lid having a peripheral flange which fits over the lip of the body, the handle or handles being movable between the operative and inoperative positions when the lid is fitted. Each handle supporting lug is preferably formed with a recess or notch facing towards the open end of the container body and adapted to accommodate the flange of the container lid when the latter is fitted.

The invention will now be described, by way of non-limiting example, with reference to the accompanying drawings.

BRIEF DESCRIPTION OF THE DRAWINGS

The same reference numerals are used in all the drawings to indicate the same or corresponding component parts.

DESCRIPTION OF THE PREFERRED EMBODIMENTS

Figure 1:
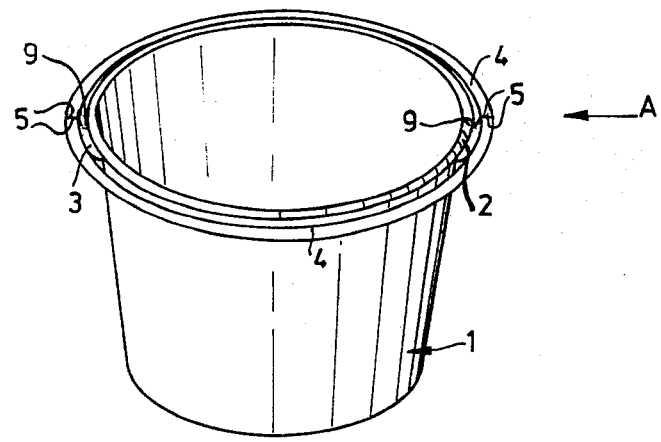
FIG. 1 is a diagrammatic perspective view of a container according to one embodiment of the invention.
Figure 2:
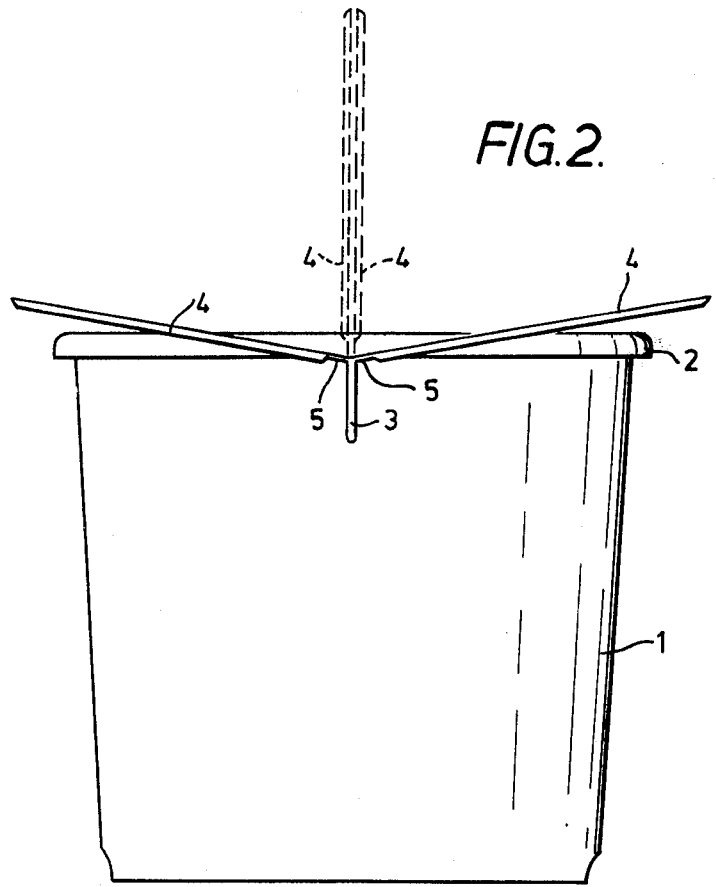
FIG. 2 is a diagrammatic side elevation of the container, not to the same scale as FIG. 1, taken in the direction of arrow A of FIG. 1.

The container shown in FIGS. 1 and 2 is designed for holding comestible products, for example lemon slices. The container comprises an injection-molded plastics body 1 in the form of a cup the open end of which is surrounded by a peripheral outwardly turned lip 2.

The container body 1 is molded in one piece with at least one, in this example, two, carrying handles. Thus the body 1, which in this example has a circular cross-section, is molded integrally with two diametrically opposed lugs 3 disposed beneath the lip 2, the outer ends of the lugs 3 carrying two symmetrically arranged substantially semicircular handles 4.

Each handle 4 is attached at opposite ends to the respective lugs 3 by a ligament hinge 5 of plastics material, formed either directly in the molding of the container or formed subsequently by scoring the root portion of the respective molded handle 4 at its junctions with the lugs 3. The hinge axes of the two handles 4 defined by the hinges 5 are parallel to each other and separated by the thickness of the lugs 3.

The ligament hinges 5 allow the handle 4 to hinge between inoperative positions, shown in FIG. 2, in which the handles 4 lie on opposite sides of the container, outwardly of the lip 2, allowing free access to the contents of the container when the latter is open, and an operative or carrying position in which the two handles 4 lie alongside each other and overlie the container, extending across the open end of the body 1, as illustrated in broken outline in FIG. 2.

The natural resilience of the hinges 5 will in general cause the two handles 4 to be inclined upwardly from the hinges 5 in their inoperative positions, as shown in FIG. 2, facilitating gripping of the handles 4 when it is desired to lift the container.

Figure 3:
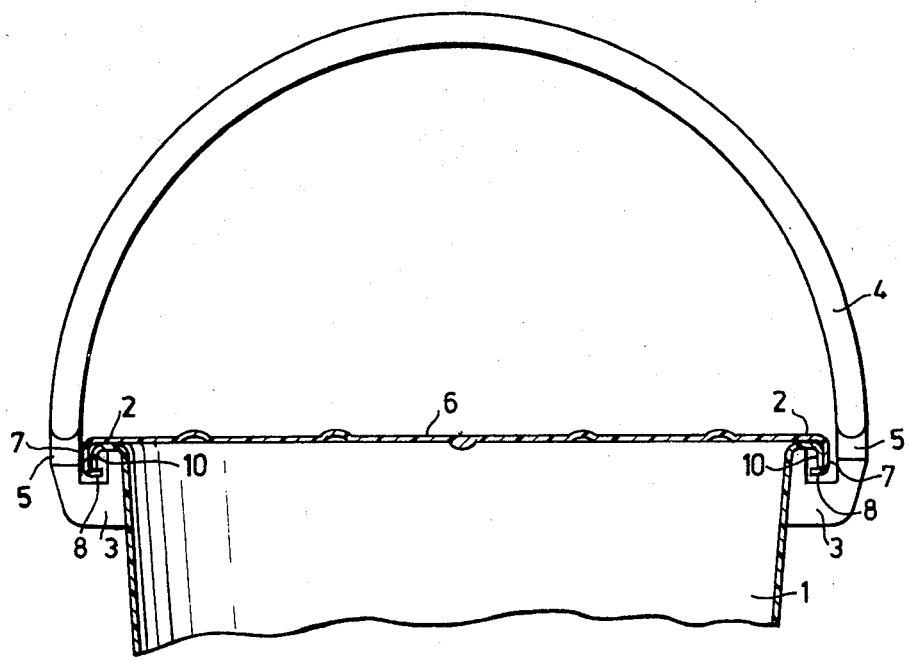
FIG. 3 is a diagrammatic sectional view of part of a container according to another embodiment of the invention.

FIG. 3 shows an embodiment of the invention similar to that of FIGS. 1 and 2, but having a single semicircular handle 4 attached to and integrally formed with the lugs 3 by respective molded ligament hinges 5.

The container according to the invention is preferably provided with a removable lid (not shown in FIGS. 1 and 2) also preferably of molded plastics material, which snap-fits over the curved peripheral lip 2 of the cup 1 and forms on effective seal therewith. As illustrated in FIG. 3, the lid 6 has a peripheral depending flange 7 formed with a radially inwardly projecting lip 8. The flange 7 is accommodated in the annular gap between the lip 2 of the body 1 and the handles 4 when the handles are in their inoperative position, as shown in FIG. 1. The two lugs 3 are each formed with a recess or notch 9 facing towards the open end of the body 1 to accommodate the flange 7 of the lid 6.

Each lug 3 has a root portion adjoining the container body 1 which is spaced radially inwardly from a depending skirt portion 10 of the lip 2 to allow the lipped flange 7 of the lid 6 to snap over the free edge of the skirt portion 10.

The container with its integral handle or handles according to this invention can be molded in plastics relatively inexpensively, and has the practical and economic advantage of dispensing with the need for a separate handle or handle fitting operation.

A multiplicity of uses are envisaged for the container according to the invention. For example, the container may be used to contain comestible products, such as, for example, lemon slices. By using the integral handles, the container with its contents can be picked up and moved without difficulty, without risk of spilling the contents. The container is also useful for other products such as, for example, paint or building materials, where its integral handle or handles would prove advantageous.

Figure 4:
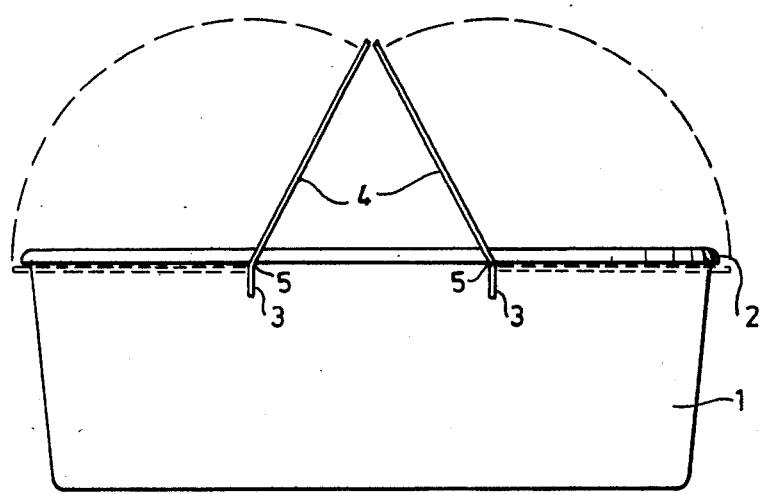
FIG. 4 is a diagrammatic side elevation of a container according to yet another embodiment of the invention.

Although the embodiments of FIGS. 1 to 3 are containers of essentially cylindrical shape, it will be appreciated that in practice the container may have any convenient shape, and may, for example, be square in section, with an appropriately shaped handle or handles. FIG. 4 illustrates an alternative version in which the container body 1 is rectangular, and has two molded handles 4 attached by respective ligament hinges 5 to individual molded lugs 3, the parallel hinge axes of the two handles 4 being in this case separated by a sufficient distance to enable the handles 4 to be disposed outwardly of the ends of the container body 1 in their inoperative positions, as shown in broken outline.

The container may be molded with the handle or handles in the operative position: preferably, however, the handles are molded in their inoperative positions, to facilitate subsequent printing, filling and lidding operations, particularly where these are performed by machine.

I claim:

1. A container comprising a molded plastic body having an open end formed with an outwardly projecting peripheral lip; at least one plastic handle molded integrally with said body; integrally formed outwardly projecting lugs disposed on opposite sides of the body; plastic ligament hinge portions molded integrally with said lugs and with said at least one handle, said hinge portions being spaced outwardly from said lip, and said at least one handle having a shape conforming to part of said lip, and being movable about said hinge portions between an inoperative position at one side of the container body and an operative, carrying, position extending across the open end of the container body, and a lid having a peripheral flange which fits over the lip of the body, each handle-supporting lug being formed with a recess facing towards the open end of the container body and adapted to accommodate the flange of the container lid when the latter is fitted.

2. The container defined in claim 1, including a radially inwardly projecting lip formed on the lid flange, wherein the lip of the container body is formed at its outer end with a depending skirt portion, each handle-supporting lug having a root portion spaced radially inwardly from the said skirt portion to allow snap-engagement of the lipped flange of the lid over the skirt portion upon fitting of the lid to the container body.

3. The container defined in claim 1, wherein the container body, the ligament hinges, and said at least one handle are molded with said handle in its inoperative position.

4. The container defined in claim 1, wherein the body is molded integrally with two handles, the ligament hinges supporting said handles being arranged so that the handles are disposed symmetrically on opposite sides of the container body in their inoperative positions.

5. The container defined in claim 4, wherein the two handles are molded integrally with two supporting lugs arranged on opposite sides of the container body, the ligament hinges connecting each lug to the two handles defining respective parallel hinge axes which are separated by the thickness of the lug, so that the two handles lie alongside each other in their operative, carrying positions.

6. The container defined in claim 4, wherein the container has a rectangular shape, the ligament hinges defining the hinge axes of the two handles being parallel to each other and equidistant from opposite sides of the container.

* * * * *